US012657461B2

(12) United States Patent　　　(10) Patent No.:　US 12,657,461 B2

Khani et al.　　　(45) Date of Patent:　Jun. 16, 2026

(54) COLLABORATIVE DEVELOPMENT OF MACHINE LEARNING MODELS ON SPECIFIC CONCEPTS

(71) Applicant: Microsoft Technology Licensing, LLC, Redmond, WA (US)

(72) Inventors: Fereshte Khani, San Francisco, CA (US); Marco Tulio Correia Ribeiro, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 18/776,709

(22) Filed: Jul. 18, 2024

(65) Prior Publication Data

US 2024/0370727 A1　　Nov. 7, 2024

Related U.S. Application Data

(63) Continuation of application No. 18/311,626, filed on May 3, 2023, now abandoned.

(51) Int. Cl.
G06N 3/08　　　(2023.01)
G06F 40/40　　　(2020.01)

(52) U.S. Cl.
CPC .............. G06N 3/08 (2013.01); G06F 40/40 (2020.01)

(58) Field of Classification Search
CPC .......... G06N 3/08; G06N 3/045; G06N 20/00; G06F 40/40; G06F 40/30

(Continued)

(56) References Cited

U.S. PATENT DOCUMENTS 11,200,497 B1 * 12/2021 Yan ......................... G06N 3/082
11,531,846 B1 * 12/2022 Bodapati ................ G06N 20/00
(Continued)

OTHER PUBLICATIONS

Marco Tulio Ribeiro, Sameer Singh, and Carlos Guestrin. 2018. Semantically Equivalent Adversarial Rules for Debugging NLP models. In Proceedings of the 56th Annual Meeting of the Association for Computational Linguistics (vol. 1: Long Papers), pp. 856-865. (Year: 2018).*

(Continued)

*Primary Examiner* — Thuykhanh Le
(74) *Attorney, Agent, or Firm* — Han Gim; Newport IP, LLC

(57)　　　ABSTRACT

A system and method and for collaboratively developing one or more concepts in a machine-learning (ML) model includes receiving a set of user generated data points and training a local ML model based on the user generated data points. A first prompt is generated based on the set of user generated data points and transmitted to a large language model (LLM) to prompt the LLM to automatically generate synthetic training data for training the ML model on the concept. Some of the data points in the synthetic training data are labeled to generate a set of labeled synthetic training data and the local ML model and the ML model are updated based on the set of labeled synthetic training data. A second prompt is then generated, based on the set of labeled synthetic training data and transmitted to the LLM to prompt the LLM to automatically generate an updated set of synthetic training data. The process of labeling the synthetic training data to generate a set of updated labeled training data, updating the local ML model and the ML model based on the set of updated labeled training data; generating another prompt based on the updated labeled training data, transmitting the second prompt to the LLM and receiving from the LLM another updated set of synthetic training data (Continued)

is repeated until the ML model no longer disagrees with the local model with respect to the concept.

20 Claims, 7 Drawing Sheets

(58) Field of Classification Search
USPC .............................................................. 704/9
See application file for complete search history.

(56) References Cited

U.S. PATENT DOCUMENTS

| | | | |
|---|---|---|---|
| 11,551,803 B1* | 1/2023 | Arazi | G16H 50/70 |
| 11,928,560 B2* | 3/2024 | Funane | G06F 18/214 |
| 12,174,915 B1* | 12/2024 | Maeng | G06F 18/2178 |
| 12,223,259 B1* | 2/2025 | Sembium Varadarajan | |
| | | | G06F 21/6254 |
| 12,333,396 B2* | 6/2025 | Choi | G06N 3/096 |
| 12,361,215 B2* | 7/2025 | Wei | G06F 40/30 |
| 12,524,845 B2* | 1/2026 | Kreis | G06T 5/70 |
| 12,526,529 B2* | 1/2026 | Pieper | H04N 23/73 |
| 2020/0387812 A1* | 12/2020 | Lewis | G06N 20/20 |
| 2022/0094713 A1* | 3/2022 | Lee | G06F 18/214 |
| 2022/0284280 A1* | 9/2022 | Walters | G06N 3/091 |
| 2023/0267700 A1* | 8/2023 | Farre Guiu | G06V 10/462 |
| 2023/0351203 A1* | 11/2023 | Ozay | G06N 3/096 |
| 2023/0377099 A1* | 11/2023 | Kreis | G06N 3/0475 |
| 2023/0410022 A1* | 12/2023 | Childress | G06N 20/00 |
| 2024/0020715 A1* | 1/2024 | Childress | G06F 40/30 |
| 2024/0028312 A1* | 1/2024 | Gillman | G06F 8/35 |
| 2024/0045990 A1* | 2/2024 | Boyer | G06F 21/6245 |
| 2024/0086164 A1* | 3/2024 | Kramer | G06F 8/36 |
| 2024/0095077 A1* | 3/2024 | Singh | G06F 9/5027 |
| 2024/0095463 A1* | 3/2024 | Leary | G06F 40/20 |
| 2024/0126576 A1* | 4/2024 | Bent, III | G06Q 30/0276 |
| 2024/0126997 A1* | 4/2024 | Bent, III | G06Q 30/0242 |
| 2024/0161377 A1* | 5/2024 | Luo | G06N 3/08 |
| 2024/0177052 A1* | 5/2024 | Yuan | G06F 18/22 |
| 2024/0184812 A1* | 6/2024 | McDaniel | G06F 40/35 |
| 2024/0184991 A1* | 6/2024 | Mahabaleshwarkar | |
| | | | G06F 40/35 |
| 2024/0185997 A1* | 6/2024 | Kapur | A61B 5/7275 |
| 2024/0202539 A1* | 6/2024 | Poirier | G06F 16/338 |
| 2024/0256793 A1* | 8/2024 | Maschmeyer | G06F 40/40 |
| 2024/0281705 A1* | 8/2024 | Liu | G06N 3/045 |
| 2024/0311579 A1* | 9/2024 | Dong | G06F 40/284 |
| 2024/0320595 A1* | 9/2024 | Manchandra | G06Q 10/0639 |
| 2024/0330279 A1* | 10/2024 | Truong | G06F 16/2428 |
| 2024/0330655 A1* | 10/2024 | Hearty | G06N 20/00 |
| 2024/0330766 A1* | 10/2024 | Hard | G06N 20/00 |
| 2024/0346362 A1* | 10/2024 | Andre | G06N 3/0455 |
| 2024/0346388 A1* | 10/2024 | Wilczynski | G06N 20/20 |
| 2024/0347064 A1* | 10/2024 | Li | G06N 3/045 |
| 2024/0354641 A1* | 10/2024 | Miller | G06N 3/045 |
| 2025/0053501 A1* | 2/2025 | Ayyadurai | G06F 11/3684 |
| 2025/0087349 A1* | 3/2025 | Neumann | G06N 3/09 |
| 2025/0094811 A1* | 3/2025 | Achtibat | G06N 5/045 |
| 2025/0245441 A1* | 7/2025 | Porras | G06F 40/40 |
| 2025/0324199 A1* | 10/2025 | Nyayate | H04R 5/033 |
| 2025/0371043 A1* | 12/2025 | Yurtsever | G06F 16/3325 |
| 2025/0384341 A1* | 12/2025 | Cella | G06N 20/00 |
| 2026/0004049 A1* | 1/2026 | Gursha | G06F 40/134 |
| 2026/0004526 A1* | 1/2026 | Kreis | G06T 17/20 |

OTHER PUBLICATIONS

He, et al.,"Targeted Data Generation: Finding and Fixing Model Weaknesses," arXiv, May 28, 2023, pp. 8506-8520.
International Search Report and Written Opinion received for PCT Application No. PCT/US2024/026358 dated Aug. 23, 2024, 12 pages.
Khani, et al.,"Collaborative Development of NLP Models," arXiv, May 24, 2023, 14 Pages.
Ribeiro, et al., "Adaptive Testing and Debugging of NLP Models," Proceedings of the 60th Annual Meeting of the Association for Computational Linguistics, May 1, 2022, pp. 3253-3267.
Ribeiro, et al., "Semantically Equivalent Adversarial Rules for Debugging NLP Models," Proceedings of the 56th Annual Meeting of the Association for Computational Linguistics, Jul. 15, 2018, pp. 856-865.

* cited by examiner

400

LLM

Local
Model 3

User 3

Local
Model 2

Global
Model

User 2

Local
Model 1

User 1

500

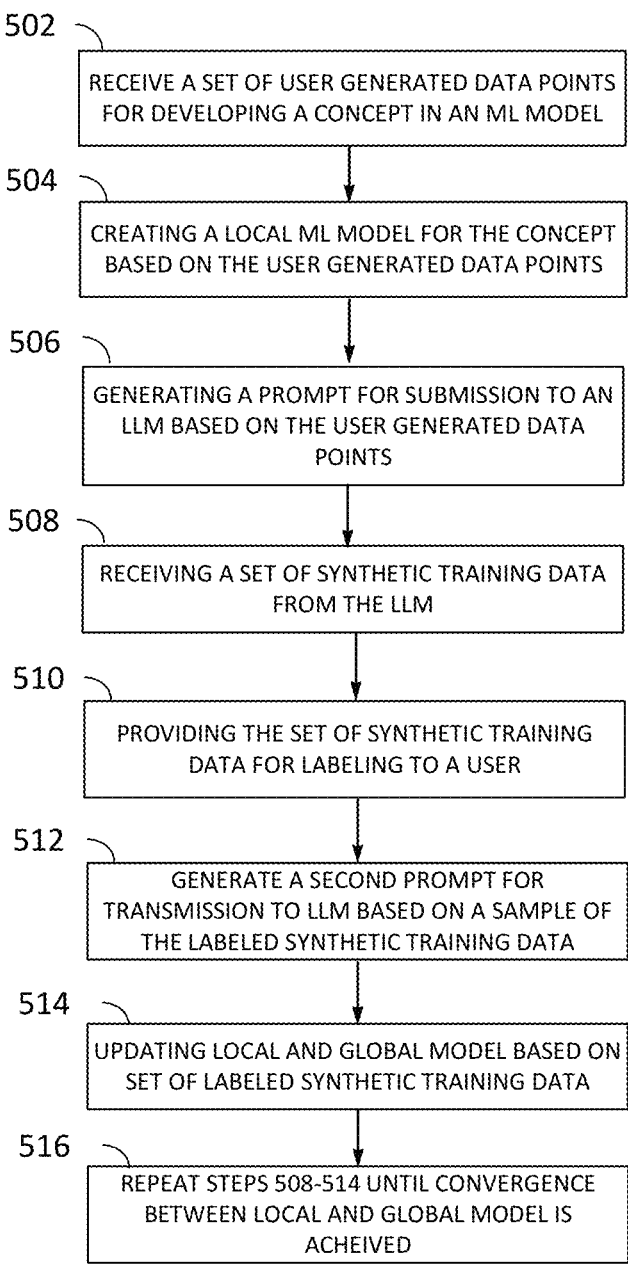

502

RECEIVE A SET OF USER GENERATED DATA POINTS FOR DEVELOPING A CONCEPT IN AN ML MODEL

504

CREATING A LOCAL ML MODEL FOR THE CONCEPT BASED ON THE USER GENERATED DATA POINTS

506

GENERATING A PROMPT FOR SUBMISSION TO AN LLM BASED ON THE USER GENERATED DATA POINTS

508

RECEIVING A SET OF SYNTHETIC TRAINING DATA FROM THE LLM

510

PROVIDING THE SET OF SYNTHETIC TRAINING DATA FOR LABELING TO A USER

512

GENERATE A SECOND PROMPT FOR TRANSMISSION TO LLM BASED ON A SAMPLE OF THE LABELED SYNTHETIC TRAINING DATA

514

UPDATING LOCAL AND GLOBAL MODEL BASED ON SET OF LABELED SYNTHETIC TRAINING DATA

516

REPEAT STEPS 508-514 UNTIL CONVERGENCE BETWEEN LOCAL AND GLOBAL MODEL IS ACHEIVED

FIG. 5

COLLABORATIVE DEVELOPMENT OF MACHINE LEARNING MODELS ON SPECIFIC CONCEPTS

BACKGROUND

In recent years, there has been a significant increase in the use of machine-learning (ML) models such as natural language processing (NLP) models. Many ML models such as NLP models receive an input such as a text segment and provide a prediction based on the input. Because of the wide use of NLP models, it is important that such models provide accurate results. However, even when aggregate accuracy is high, NLP models often fail systematically on specific concepts. This can result in biased outcomes and lead to unsatisfactory results.

Teaching a concept to an ML model, however, is a difficult undertaking. That is because the standard way in which concepts are taught to an ML model is by adding new training data that exemplifies the concept. However, it is difficult to ensure that the new training data does not lead to predictions that do not capture the true underlying concept or logic. Furthermore, simply adding new training data for training the model may lead to the model overfitting with respect to the new data by failing to generalize from the instances provided to the actual concept. Still further, new training data can lead to interference with the original training data or with other concepts captured by the ML model, which can lead to failures of the model on other concepts.

Hence, there is a need for improved systems and methods of training ML models to accurately capture concepts.

SUMMARY

In one general aspect, the instant disclosure presents a data processing system having a processor and a memory in communication with the processor wherein the memory stores executable instructions that, when executed by the processor, cause the data processing system to perform multiple functions. The functions include receiving a set of user generated data points for developing a concept in a machine-learning (ML) model, the concept being a desirable model behavior for a given set of inputs; creating a local ML model of the ML model for the concept, based on the set of user generated data points; generating a first prompt, based on the set of user generated data points, for submission as an input to a large language model (LLM) to prompt the LLM to automatically generate synthetic training data for training the ML model on the concept; transmitting the first prompt to the LLM and receiving from the LLM the synthetic training data; providing the synthetic training data to a user for labeling at least some of the synthetic training data to generate a set of labeled synthetic training data; training the local ML model and the ML model based on the set of labeled synthetic training data; generating a second prompt, based on the set of labeled synthetic training data, for transmission as the input to the LLM to prompt the LLM to automatically generate an updated set of synthetic training data; transmitting the second prompt to the LLM and receiving from the LLM the updated set of synthetic training data; and repeating a process of providing the updated set of synthetic training data to the user for labeling at least some of the updated set of synthetic training data to generate a set of updated labeled training data, training the local ML model and the ML model based on the set of updated labeled training data, generating another prompt based on the updated labeled training data, transmitting the second prompt to the LLM and receiving from the LLM another updated set of synthetic training data until when the updated set of synthetic training data is provided to the ML model and local ML model as an ML input, an output of the ML model no longer disagrees with the output of the local model.

In yet another general aspect, the instant disclosure presents a method for training an ML model to provide specific predictions for a given set of inputs. In some implementations, the method includes receiving a set of user generated data points for developing the ML model to provide the specific predictions for the given set of inputs; training a local ML model for providing the specific predictions for the given set of inputs based on the set of user generated data points, the ML model being a trained global ML model and the local ML model being a smaller ML model than the global ML model; generating a first prompt, using a prompt generating engine, based on the set of user generated data points, for submission as an input to a LLM to prompt the LLM to automatically generate synthetic training data for training the ML model on the concept; transmitting the first prompt to the LLM and receiving from the LLM the synthetic training data; labeling at least some of the synthetic training data to generate a set of labeled synthetic training data; updating the local ML model and the ML model based on the set of labeled synthetic training data; generating a second prompt, based on the set of labeled synthetic training data, for transmission as the input to the LLM to prompt the LLM to automatically generate an updated set of synthetic training data; transmitting the second prompt to the LLM and receiving from the LLM the updated set of synthetic training data; and repeating a process labeling at least some of the synthetic training data to generate a set of updated labeled training data, updating the local ML model and the ML model based on the set of updated labeled training data, generating another prompt based on the updated labeled training data, transmitting the second prompt to the LLM and receiving from the LLM another updated set of synthetic training data until the ML model no longer disagrees with the local model with respect to the concept.

In a further general aspect, the instant application describes a non-transitory computer readable medium on which are stored instructions that when executed cause a programmable device to perform functions of receiving a set of user generated data points for developing a concept in a ML model, the concept being a desirable model behavior for a given set of inputs; creating a local ML model of the ML model for the concept, based on the set of user generated data points; generating a first prompt, based on the set of user generated data points, for submission as an input to a LLM to prompt the LLM to automatically generate synthetic training data for training the ML model on the concept; transmitting the first prompt to the LLM and receiving from the LLM the synthetic training data; providing the synthetic training data to a user for labeling at least some of the synthetic training data to generate a set of labeled synthetic training data; training the local ML model and the ML model based on the set of labeled synthetic training data; generating a second prompt, based on the set of labeled synthetic training data, for transmission as the input to the LLM to prompt the LLM to automatically generate an updated set of synthetic training data; transmitting the second prompt to the LLM and receiving from the LLM the updated set of synthetic training data; and repeating a process of providing the updated set of synthetic training data to the user for labeling at least some of the updated set of synthetic training data to generate a set of updated labeled training data, training the local ML model and the ML model based on the set of updated labeled training data, generating another prompt, based on the updated labeled training data, transmitting the second prompt to the LLM and receiving from the LLM another updated set of synthetic training data until when the updated set of synthetic training data is provided to the ML model and local ML model as an ML input, an output of the ML model no longer disagrees with the output of the local model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 is a flow diagram depicting an example method for training an ML model to capture a concept.

DETAILED DESCRIPTION

Figure 1:
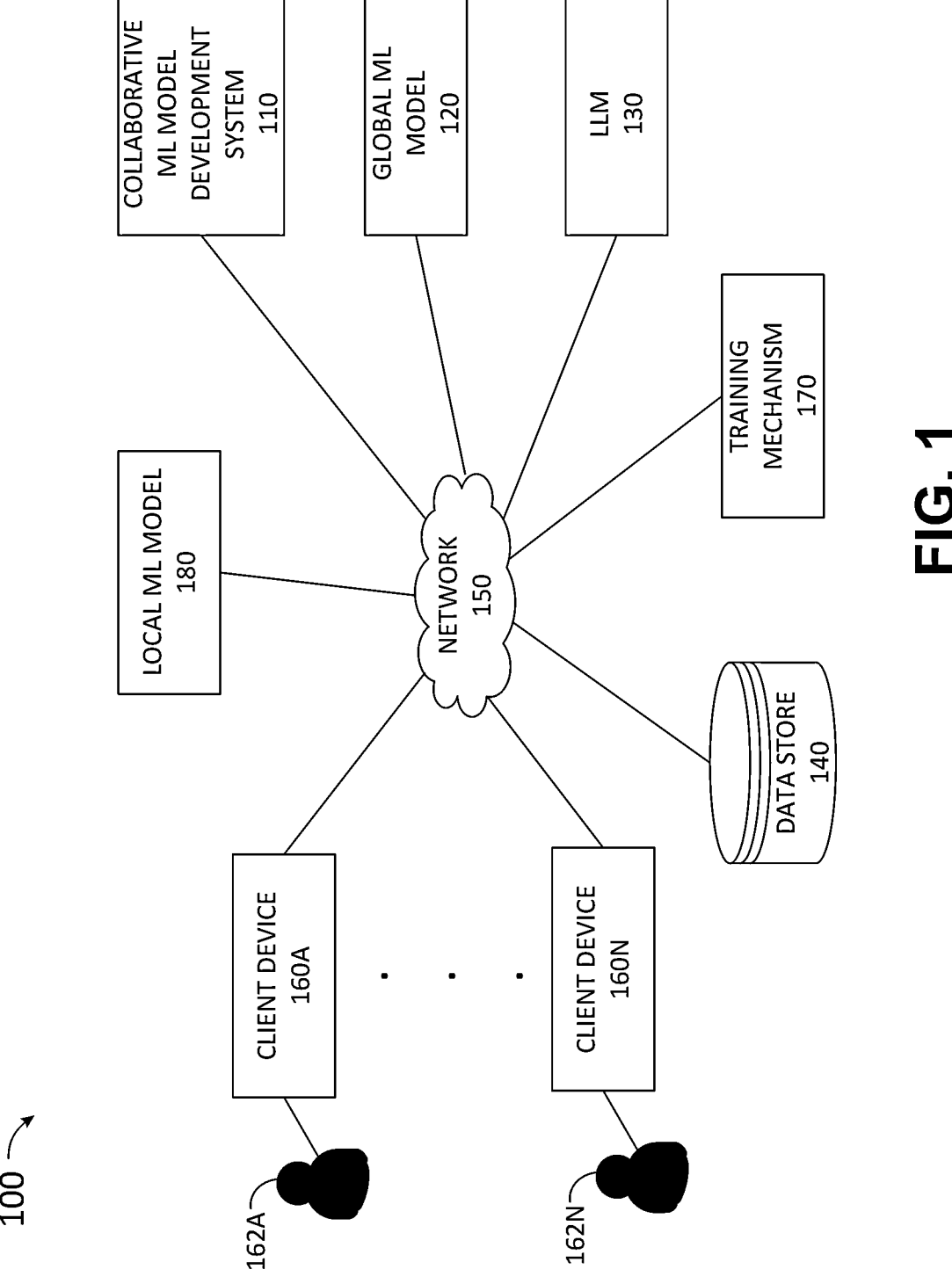
FIG. 1 depicts an example system upon which aspects of this disclosure may be implemented.

Despite having a general high accuracy, many of today's ML models still exhibit failures on specific concepts of data. The term "concept" as used herein refers to specific predictions for a given set of inputs. More generally, concept refers to a desirable model behavior or output for a given set of inputs or a specific pattern or a regularity in data that is deemed meaningful. For example, the concept of "subject S does not connote sentiment" informs the behavior that when words related to a subject S are provided as input, a sentiment prediction model provides an output of neutral sentiment (i.e., words related to subject S are neutral on sentiment). Similarly, in the context of natural language inference, the concept of "downward monotonicity" results in entailment relations when certain parts of expressions are made more specific. For example, "all cats like tuna" should lead to the prediction of "all small cats like tuna."

To develop ML models that capture specific concepts, the models have to be specifically trained on those concepts. This is important to encode accurate business rules, correct undesirable behavior, and/or ensure alignment with user values. Currently used mechanisms for teaching specific concepts to ML models involve generating training data that relates to the concepts and finetuning the models based on the generated data. However, it is difficult to ensure that training data generated for a specific concept does not lead to shortcuts such as spurious correlations or heuristics that allow models to make predictions without capturing the true underlying concept or logic. For example, when the objective is to train a sentiment model on the concept of "subject S does not connote sentiment", it is difficult to ensure that the training does not lead to the model predicting that "all sentences with terms related to subject S are neutral." Furthermore, it is challenging to train the model on the specific concept without the model overfitting the specific concept by for example failing to generalize from the instances provided to the actual concept (e.g., only recognizing pairs in the form ("all X . . . ", "all adjective X . . . "), and not pairs like ("all animals eat", "all cats eat"). Moreover, both shortcuts and overfitting can lead to interference with the original training data or other concepts. Shortcuts, overfitting and interference can lead to undesirable or unpredictable model behavior.

To ensure that shortcuts, overfitting and/or interference are minimized, the new training data should be developed such that it covers the boundaries of the concepts well. This is very challenging because users typically cannot think of all concept boundaries and interactions in advance. One way to address this problem is to have domain experts create training data that covers the concept as comprehensively and precisely as possible. However, this is a very time-consuming and expensive undertaking. Moreover, the resulting dataset is often not exhaustive, as even experts fail to think about all aspects and nuances of a concept. Another potential solution involves utilizing adversarial training in which users provide data incrementally while they receive feedback from the model or employing adaptive testing. These mechanisms do not require users to think about all aspects in advance and can expose and correct model weaknesses. However, adversarial training does not include the notion of concepts explicitly, and adaptive testing does not address interaction between different concepts or between a concept and the original data. As a result, users may not explore concept boundaries efficiently, and thus do not know when they have sufficiently covered a concept or whether they have introduced interference with other concepts. Thus, there exists a technical problem of lack of mechanisms for efficiently and effectively training ML models on specific concepts without adversely impacting the models' behavior on other concepts.

To address these technical problems and more, in an example, this description provides technical solutions for collaboratively training ML models on specific concepts. This is achieved by utilizing a system that enables users to collaborate with artificial intelligence (AI) systems and/or other uses in specifying concepts and teaching those concepts to ML models. This involves creating and training local models for specific concepts and integrating the local model with a global ML model to train the global ML model on the specific concepts. This includes using a local function to simulate a user's presence and updating the local function based on users' feedback, instead of directly updating the global model with users' feedback in order to avoid bias. The process also includes generating inputs in a disagreement region between local and global models to guide the users on training the global model on the specific concepts.

The technical solution makes a given specific concept explicit by creating a local model for the concept, in addition to the global model that integrates the original data and any additional concepts. To operationalize the new concept, the technical solution makes use of a large language model (LLM) to generate new instances of new training data, and then have users label data points in the disagreement region between the local concept model and the global model. The examples are either cases not yet learned by the global model, or cases where the concept is not yet properly specified. As users label these data points, both models are updated until convergence is reached (e.g., until the concept has been learned in a way that does not conflict with prior data or prior concepts). In this manner, each local model functions as an ever-improving inexpensive proxy for the user in its own concept, whose speed of prediction allows users to explore the boundaries between concepts and existing data. This enables efficient training of the global model on a given concept in a way that does not create interference.

The technical solution described herein addresses the technical problem of underperformance of ML models with respect to specific concepts and the difficulty in training ML models to learn about specific concepts without adversely affecting the model's behavior with respect to other concepts. The technical solution utilizes an inexpensive local model and a user in the loop to train a global model in a collaborative manner that is both efficient and reduces interference, overfitting and shortcuts. The technical effects include at least (1) improving the accuracy of ML models with respect to specific concepts; (2) improving the process of training an ML model with respect to specific concepts; and (3) reducing interference, overfitting and shortcuts in the resulting ML model.

FIG. 1 illustrates an example system 100, upon which aspects of this disclosure may be implemented. The system 100 includes a collaborative ML model development system 110, a local ML model 180, a global ML model 120, an LLM 130, a data store 140, a training mechanism 170, and a plurality of client devices 160A-160N (collectively referred to as client device 160). Each of the collaborative ML model development system 110, local ML model 180, global ML model 120, LLM 130, data store 140, and training mechanism 170 may be stored on and/or executed by one or more servers that work together to deliver the functions and services provided by each service or application included in the servers.

In some implementations, the collaborative ML model development system 110 receives a request for training an ML model such as the global ML model 120 on a specific concept. The request may be received from one of the client devices 160A-160N. For example, a user 162A-162N may utilize an application on a client device 160A-160N to provide seed data for a concept they are interested in further developing in the global ML model 120. The seed data includes example data points for the user's concept of interest. In some implementations, the request is submitted by the user 162 of the client device 160 by utilizing an administrator portal for the system 100 or by using specific applications. The collaborative ML model development system 110 operates to transmit data between various elements of the system 100. In some implementations, the collaborative ML model development system 110 utilizes the training mechanism 170 to train a local ML model 180 on the concept. This may be achieved by training a pretrained model on the seed data provided by the user 162 to generate an inexpensive local ML model that is trained specifically for the concept of interest.

The global ML model 120 is a trained ML model such as an NLP model that receives textual content as an input and generates an output based on this input. As noted above, the global ML model 120 may underperform with respect to specific concepts. Upon receiving the request to optimize the global ML model 120 with respect to a specific concept, the collaborative ML model development system 120 communicates with the training mechanism 170 to create the local ML model 180 for the specific concept. In some implementations, the collaborative ML model development system 110 works directly on training the lobal ML model 180 by providing the seed data to a pretrained model to train the local ML model 180. Further details regarding the operation of the collaborative ML model development system 110 is provided with respect to FIG. 2.

The LLM 130 is a deep learning algorithm that can recognize, summarize, translate, predict and/or generate text and other content based on knowledge gained from very large training datasets. Examples of LLMs include, but are not limited to, generative models, such as GPT-based models, e.g., GPT-3, GPT-4, ChatGPT, and the like. The collaborative ML model development system 110 uses the LLM 130 to generate training data by prompting the LLM 130 to create similar examples as those provided by the user. The collaborative ML model development system 110 achieves this by generating a prompt transmitted to the LLM 130 to cause the LLM 130 to generate synthetically generated training data related to the specific concept.

In some implementations, a human in the loop, such as the user 162 is used to provide labels for some data points in the training data generated by the LLM 130. The user 162 communicates with the collaborative ML model development system 110 by using one or more local applications (e.g., local applications or web applications) via the network 150. The network 150 is a wired or wireless network(s) or a combination of wired and wireless networks that connect one or more elements of the system 100. The client device 160 is a personal or handheld computing device having or being connected to input/output elements that enable user 162 to interact with various applications (not shown). Examples of suitable client devices 160 include but are not limited to personal computers, desktop computers, laptop computers, mobile telephones, smart phones, tablets, phablets, smart watches, wearable computers, gaming devices/computers, televisions, and the like. The internal hardware structure of a client device and/or a server on which one of the collaborative ML model development system 110, global ML model 120, local ML model 180 or LLM 130 is stored is discussed in greater detail with respect to FIGS. 6 and 7.

In some implementations, the local ML model 180 and/or the global ML model 120 are trained by using the training mechanism 170. The training mechanism 170 uses training data sets stored in the data store 140 to provide initial and ongoing training for the local ML model 180 and/or global ML model 120. In some implementations, the training mechanism 170 uses labeled training data to train the ML models via deep neural network(s) or other types of models. The initial and/or subsequent training may be performed in an offline stage.

The data store 140 functions as a repository in which databases relating to training, validation, and testing of the ML models 120 are stored. Although shown as a single data store, the data store 140 is representative of multiple storage devices and data stores which may be accessible by one or more of the collaborative ML model development system 110, training mechanism 170, global ML model 120, local ML model 180, client devices 160 and/or LLM 130. Once additional training data is generated by the LLM 130 and/or labelled, the additional training data is stored in the data store 140 for use in training of the local ML model 180 and global ML model 120.

Figure 2:
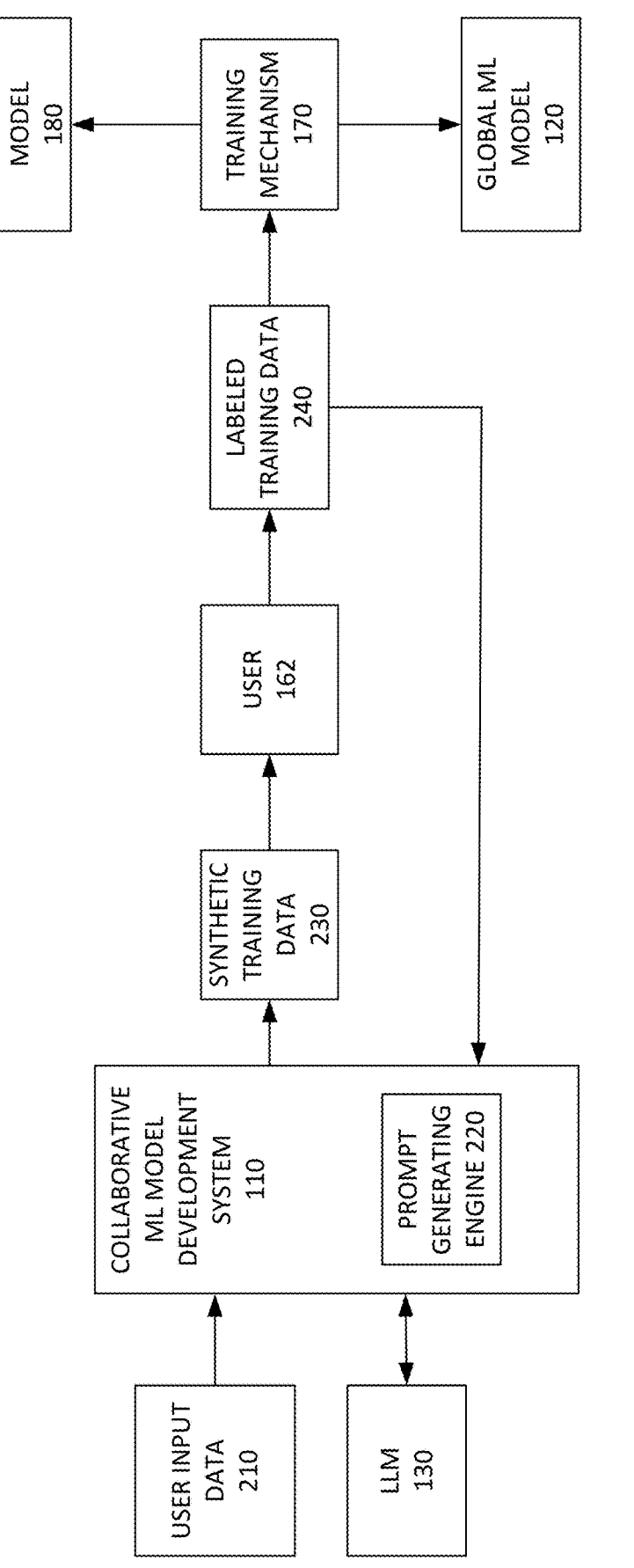
FIG. 2 depicts an example of some elements involved in collaborative development of an ML model.

FIG. 2 depicts an example of some elements involved in collaborative ML model development. Once a request for developing an ML model with respect to a concept is received, the collaborative ML model development system 110 utilizes the user input data 210 to create the local ML model 180. The user input data 210 includes seed data generated by the user as examples of the concept the global model needs to learn. As such, the user input data 210 may include a few datapoints that contain input data (e.g., a text segment such as sentence) and the correct output data (e.g., label for the text segment). Because the user input data 210 is being generated by a user for a specific concept, it includes only a limited number of examples.

Complex functions can be approximated by simpler functions in a local neighborhood. Because a concept is a natural local neighborhood, the technical solution creates a local model that approximates the global model in the local neighborhood of the concept. This is done by treating the global ML model as a function $f(x)=y$, where x is an input to the model, such as a text string and y is a categorical label (e.g., for a sentiment analysis model, x is a text string and y is the sentiment such as positive, negative or neutral) and the function $\hat{f}(x)$ approximates the function $f(x)$ in the concept $C_i$. Furthermore, it is assumed that the system has access to a base training dataset (e.g., the original training dataset on which the global model was trained). The base training dataset is denoted as $D_o$ with $D_o=\{(x_1, y_1), \ldots, (x_n, y_m)\}$, from a base distribution denoted as $P_o$. A concept $C_i$ is associated with a distribution $P_i$ over the input space. For example, a concept may place probability mass exclusively on sentences containing words related to subject S. In this respect, $x \in C_i$ if $P_i(x))>0$. Because it is difficult for users to be exhaustive when generating examples, it is not assumed that users can generate from $P_i$. However, users can label any x with $f(x)$, and can also indicate whether or not x is in the concept $C_i$. Moreover, the users provide a small number of samples in support of $P_i$. Those samples form the user input data 210. Thus, the collaborative ML model development system 110 creates the local ML model 180 based on the user input data 210 but in a way that approximates the global ML model 120 in the neighborhood of the concept. This may be done by utilizing a pretrained ML model and training the pretrained ML model based on the user input data 210. The pretrained ML model may be a model from which the global ML model 120 was also trained. The collaborative ML model development system 110 may create the local ML model 180 by using a training mechanism (e.g., training mechanism 170 of FIG. 1).

In addition to creating the local ML model 180, the collaborative ML model development system 110 also generates prompts for the LLM 130 to invoke the LLM 130 to generate synthetic training data 230. This is because it is difficult to sample from the concept distribution $P_i$ and as a result finding regions of the concept distribution $P_i$, where the local or the global models fail is a challenging task. To address this, the collaborative ML model development system 110 utilizes the LLM 130 as a training data generator to simulate a random walk within the concept. To do so, the collaborative ML model development system 110 utilizes the prompt generating engine 220 to generate a prompt for transmission to the LLM 130. In some implementations, the prompt generating engine 220 constructs a prompt with m number of in-concept examples, where m is the number of examples in the user input data 210. The value of m controls the tradeoff between precision and recall, with a high m generating more in-concept examples and low m exploring the space more broadly. The prompt may be generated automatically by the prompt generating engine 220 or may be generated by a user and transmitted to the collaborative ML model development system 110 for transmission to the LLM 130.

The prompt is used as an input to the LLM 130 to generate more samples that resemble the examples provided in the prompt. In response, the LLM 130 generates a large set of synthetic training data 230 as an output which is transmitted back to the collaborative ML model development system 110. The synthetic training data 230 includes a number of example datapoints x' that are related to the concept $C_i$ since the prompt provided to the LLM 130 includes examples from the concept.

The collaborative ML model development system 110 provides the generated synthetic training data 230 to the user 162 for labeling. The user can choose data points in the training data 230 where the local ML model 180 and the global ML model 120 disagree and for those data points indicate whether each input x' is related to the concept (e.g., $x' \in C_i$) and whether the label for each sample is correct. Thus, the user labels the training data to generate a labeled training data 240. The labeled training data 240 is transmitted to the collaborative ML model development system 110, which takes some samples from the labeled training data 240 to generate another prompt for the LLM 130. The LLM 130 uses the new prompt to generate new examples in the concept. The newly generated synthetic training data 230 is then provided to the user 162 for labeling. This process is repeated until convergence between the local and global ML models 180 and 120 is reached. At that point, the labeled training dataset 240 is used by the training mechanism 170 to finetune both the local ML model 180 and the global ML model 120.

In this manner, the local ML model 180 is used to generate a disagreement region between the local ML model 180 and the global ML model 120 (i.e., between the local and global functions). That is because the local and global models disagree on regions where the concept has not yet been learned (e.g., the global model is wrong) or the local model does not fit the user's concept correctly (e.g., the local model is wrong). Thus, every label from the disagreement region results in an improvement in whichever model is incorrect. As labeling progresses, both the local ML model 180 and the global ML model 120 are updated until convergence is reached (i.e., until $\hat{f}$ has learned the concept $C_i$). It should be noted that while $\hat{f}_t$ is trained on data from $P_i$, $\hat{f}$ is trained to do well on the base distribution $P_0$, as well as on all concepts $P_{1:k}$.

In some implementations, a score function is defined as the disagreement between the local and global function. This score function is used to steer generation of new training data to maximize the score of generated samples by adding instances to the prompt for the LLM 130 with probability proportional to their score. This score function is used in selecting samples from the labeled training data 240 for generating the next prompt to the LLM 130.

It should be noted that models sometimes present false agreement on some samples (e.g., $\hat{f}_t(x)=\hat{f}_0(x')\neq f(x')$. To account for this issue, some training data points are also generated from the agreement region, with a probability that decays over time, as more confidence is gained in the local ML model. The following example algorithm provides an example pseudo-code for operationalizing a concept.

---

Algorithm 1: Operationalizing a new concept i

---

Input: Base dataset $D_0$
    Concept datasets $D_{1:i-1}$
    A small set of samples from concept $D_i$
Init local: Train $\hat{f}_L$ on $D_i$;
Init global: Train $\hat{f}$ on $D_{0:i-1}$;
do
    for L iterations do
        Generation: Prompt LLM with subset from $D_i$ chosen with
        probability $\propto |\hat{f}(x) - \hat{f}_f(x)|$;
        Labeling: Select b samples with probability $\propto |\hat{f}(x') - \hat{f}_L(x')|$. Users
        reject x' if it is out of concept, or add to $D_i$ with label $\hat{f}(x')$;
        Update local: Train $\hat{f}_L$ on $D_i$;
        Update global: Train $\hat{f}$ on $D_{0:i}$;
    while $D_i$ was updated this round;
    output : A dataset $D_i$

---

As illustrated in the algorithm, the local and global models are first initialized with the local model being initialized with the user input data 210 and the global model being initialized with the previous dataset (e.g., the last training dataset on which the model was trained). In practice, initialization refers to finetuning the models with the given training datasets. The LLM 130 is then prompted to generate in-concept samples that are likely to be in the disagreement region. Next, a batch of b samples from the generated samples are selected for labeling according to the disagreement score of the generated instances. This training data generation and labeling loop is repeated for L iterations, after which both the local and global models are updated (e.g., finetuned with the latest generated and labeled training data. After a few iterations, the functions $\hat{f}$ and $\hat{f}_L$ converge. This means that the user has operationalized the concept and the global ML model has learned it. If the number of generated samples is large enough, it can be assumed that when there is no disagreement on generated samples between $\hat{f}$ and $\hat{f}_L$, the functions have converged. At that point, the process is stopped and the generated $D_i$ is provided as an output.

Any updates made to one region of the global model can have an impact on other regions. Having local functions enable us to check interference efficiently. To ensure that interference is minimized, when a user operationalizes a new concept according to Algorithm 1, the resulting global model is checked against the local concept models for all previous concepts. In some implementations, this is achieved by re-executing Algorithm 1 but only having the user label the generated training dataset, if there is a new-found disagreement region. In practice, this means that a user adding a new concept needs to make sure it does not break any concepts from other users. While the goal is to reduce interference, having a multiplicity of concepts is beneficial in exposing false agreement regions between the global model and any individual concept model. In other words, while both $\hat{f}$ and $\hat{f}_L$, may be relying on the same shortcut to solve some regions of $P_i$, it is unlikely that this shortcut does not cause disagreement between $\hat{f}$ and one or more local models $\hat{f}_L$ for j≠i. In this case, the interference caused by adding $C_j$ is actually beneficial, as it further refines the concept $C_i$. In practice, the original dataset ($D_0$) is often very large. As such, it is challenging to finetune the global model on $D_{0:k}$. As a result, instead of choosing the entire $D_0$, data points with the highest disagreement between $\hat{f}$ and $\hat{f}_0$ maybe sampled from $D_0$. In other words, $\hat{f}_0$ is treated as a user with the concept distribution $P_0$. This enable the system to handle interference between the different local concept models as well as the original model.

Figure 3:
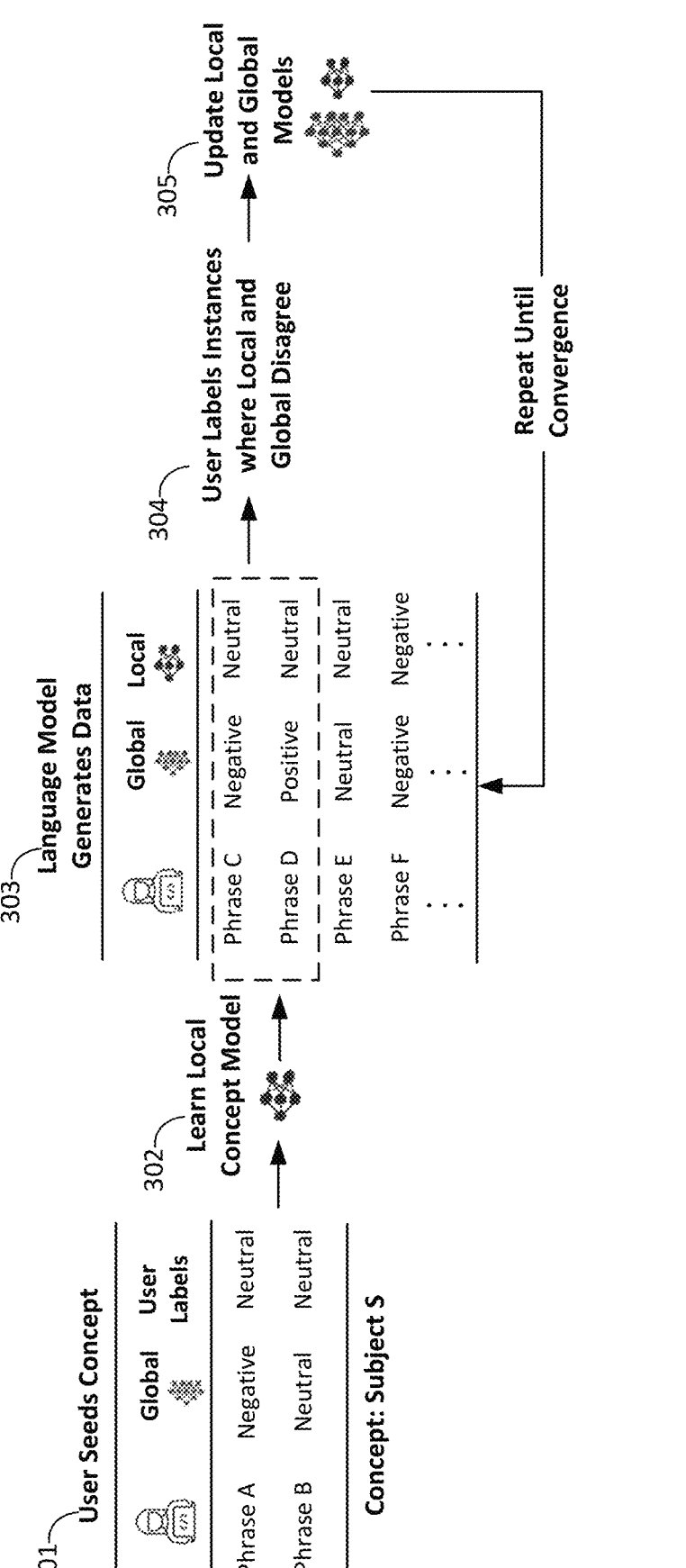
FIG. 3 depicts a simplified example of developing a global model on a specific concept.

FIG. 3 depicts a simplified example of developing a global model on a specific concept. As depicted, the concept of neutrality of a subject S may be selected as a concept that a sentiment prediction model needs to be further developed on. That may mean that a user has determined that the model provides unsatisfactory results with respect to this concept. In some implementations, the concepts are identified based on user feedback. For example, when multiple users complain about the model not performing well with respect to a concept, the concept is selected for development. Once the concept is selected, a user may be asked to provide some seed input data related to the concept. In the example of FIG. 3, the user has provided the phrases "Phrase A" and "Phrase B" as seed examples in operation 301. These seed examples are phrases related to the subject S. The user has also included that the correct sentiment labels for these examples should be neutral. However, as depicted, the sentiment model produces a negative sentiment for the phrase "Phrase C."

Once the user has submitted the user seed examples, a local model is trained on the concept, at operation 302. Additionally, at operation 303, an LLM model such as but not limited to a GPT-3 (or GPT-4) model generates more example datapoints based on the user provided seed examples. Other types of language models may also be utilized in other implementations. FIG. 3 displays the resulting output of each of the global and local models, when provided with the GPT generated data samples. For example, for the phrase "Phrase C", the global model outputs a negative sentiment, while the local model outputs a neutral sentiment. The generated data samples are provided to a user for labeling, at operation 304. The user labels instances of the data, where the local and global models disagree. The user may also indicate which of the generated data samples are related to the concept and which ones are not. The local and global models are then updated, based on the labeled data, at operation 305, and a sample of the labeled data is used as a new prompt to the LLM to generate new data. The process is repeated until the local and global model converge.

Figure 4:
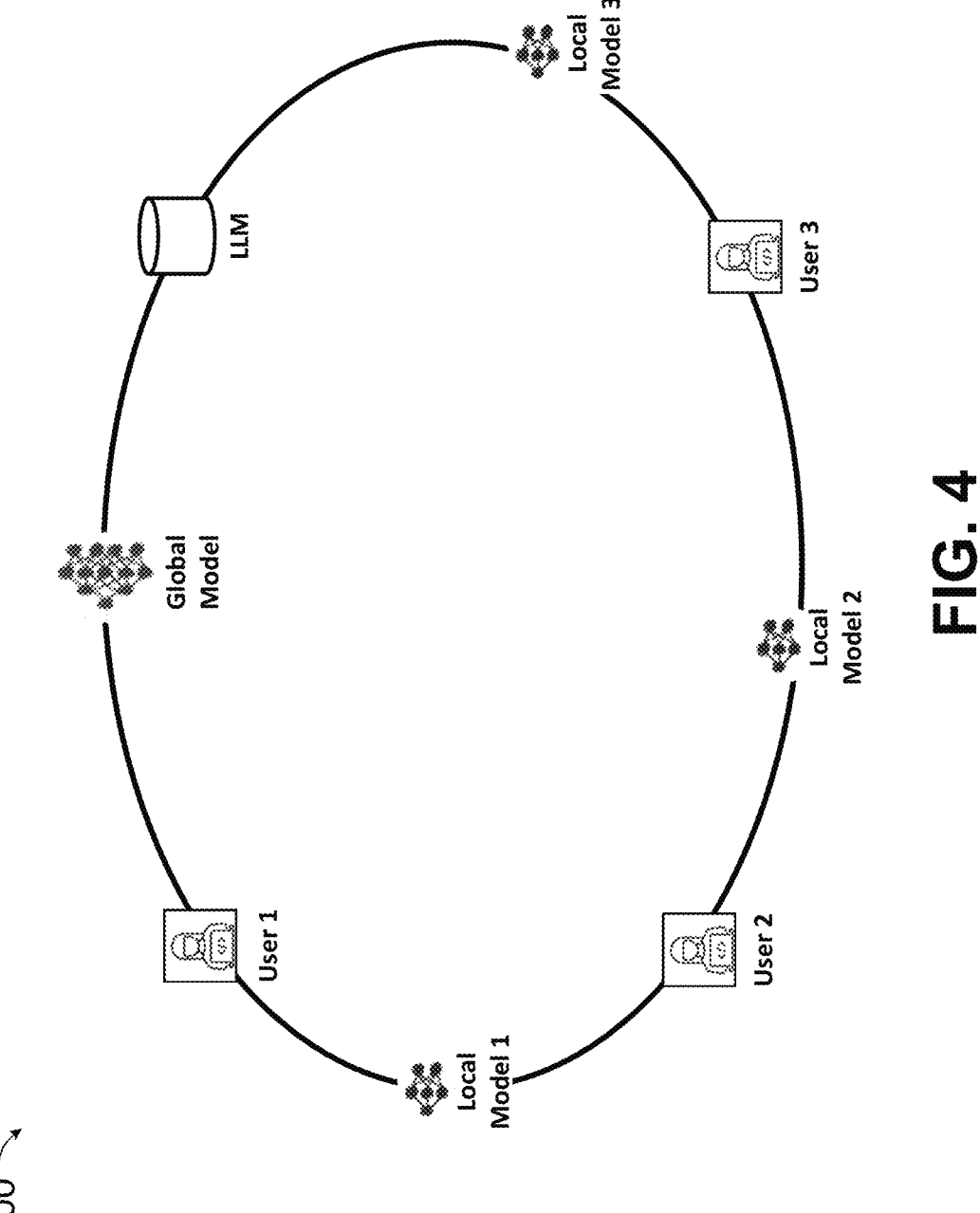
FIG. 4 depicts an example of collaborative development of an ML model with different users and different local models.

FIG. 4 depicts an example of collaborative development 400 of an ML model with different users and different local models. As illustrated multiple users can identify different concepts that a global model needs to be further trained on (i.e., the global model does not provide accurate results on the concepts) and provide seed data related to each concept from which a local model is generated. Thus, user 1 provides data for which a local model 1 is generated and user 2 provides a different set of data for a different concept for which a local model 2 is generated. Similarly, a user 3 provides another set of data, based on which a local model 3 is generated. Data from each of the user generated datasets is transmitted to the LLM model to generate synthetic training data associated with the user generated data and the synthetic training data is labeled and used to update the global model and each of the local models. In this manner, multiple users can contribute to the collaborative development of an ML model.

FIG. 5 is a flow diagram depicting an exemplary method 500 for training an ML model to capture a concept. One or more steps of method 500 may be performed by a collaborative ML model development system such as the collaborative ML model development system 110 of FIGS. 1-2 and/or by an LLM such as the LLM 130 of FIGS. 1-2. Method 500 a set of user generated data points for developing a concept in an ML model, at 502. This may occur by first receiving a request to optimize the ML model with respect to a concept and/or by receiving access to or retrieving the dataset. In some implementations, the dataset is transmitted with a request to develop the ML model with respect to a new concept. The set of user generated data points includes one or more example training data which relates to the new concept.

After receiving the set of user generated data points, method 500 proceeds to create a local ML model for the concept based on the user generated data points, at 504. In some implementations, this involves training a pretrained ML model that is associated with or similar to the global ML model based with the user generated data points. Method 500 also generates a prompt for submission to an LLM based on the user generated data points, at 506. This involves generating a prompt that includes one of more data points from the user generated data points to prompt the LLM to generate a set of synthetically generated training data based on the prompt. The prompt may be generated automatically using a prompt generating engine or may be created by a user. After it is generated, the prompt is transmitted to the LLM for processing.

Once the prompt is transmitted to the LLM, a set of synthetic training data which is generated based on the prompt is received from the LLM, at 508. The synthetic training data is then provided to a user for labeling, at 510. This may involve sending the synthetic training data to an expert in the field who can label the data. The expert may be the same as the user who generated the user generated data, or it may be a different person. In some implementations, multiple users are utilized for labeling. In some implementations, a disagreement score is generated and used for data points to identify data points in the disagreement regions of the local and global models. Data points in the disagreement regions are then used for labeling. In some implementations, the training data is provided as an input to the local model and the global ML model to receive the output of each of the local model and the global ML for each data point in the labeled set. The outputs are then compared to identify regions where the global model and the local ML model disagree. The labeling may involve reviewing the synthetic training data to determine if each data point in the training data is related to the concept and if the data point is related to the concept, providing the correct label (e.g., the correct model output) for the data point.

Once the data is labeled, method 500 proceeds to generate a second prompt for transmission to the LLM, at 512. The second prompt is generated based on a sample or all of the labeled synthetic training data. Since the data points where selected from regions of disagreement, the LLM is likely to generate training data in areas where the global ML model has weaknesses with respect to the concept.

The labeled synthetic training data is used to update the local and global ML models, at 514. This may involve finetuning the lobal and global ML models with the labeled synthetic training data. Separately, newly generated synthetic training data based on the second prompt is received from the LLM. The steps of labeling the synthetic training data, using the labeled training data to update the local and global ML models, identifying regions where the local and global ML models disagree and generating another prompt to the LLM based on the disagreement regions are repeated, at 516, until convergence between the local and global ML model is achieved. Convergence occurs when the global ML model no longer disagrees with the local ML model. That is when the labeled synthetic training data is provided to the local and global models as an input, the output of the local model is the same as the output of the global model for all or a majority of data points in the labeled synthetic training data.

Figure 6:
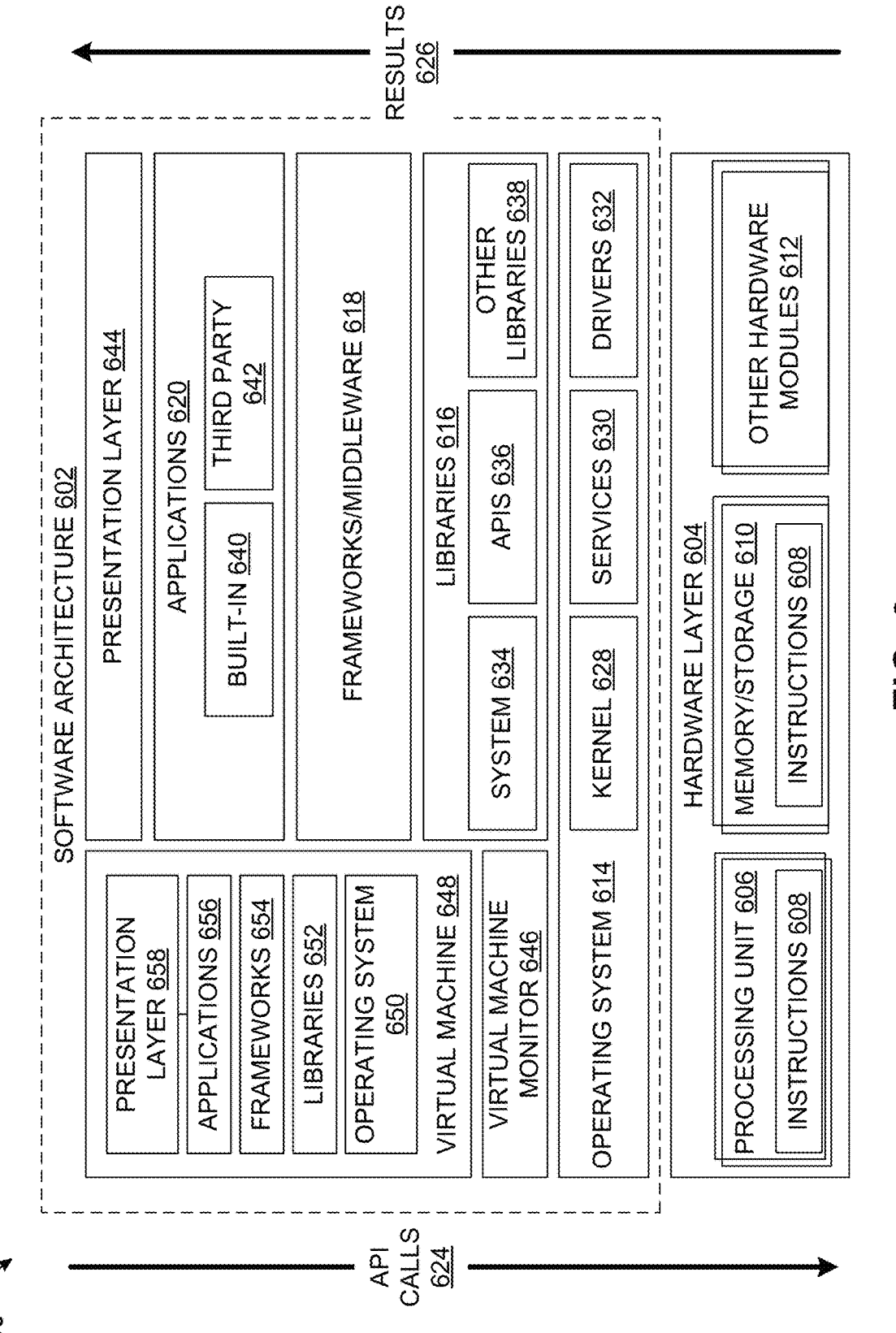
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
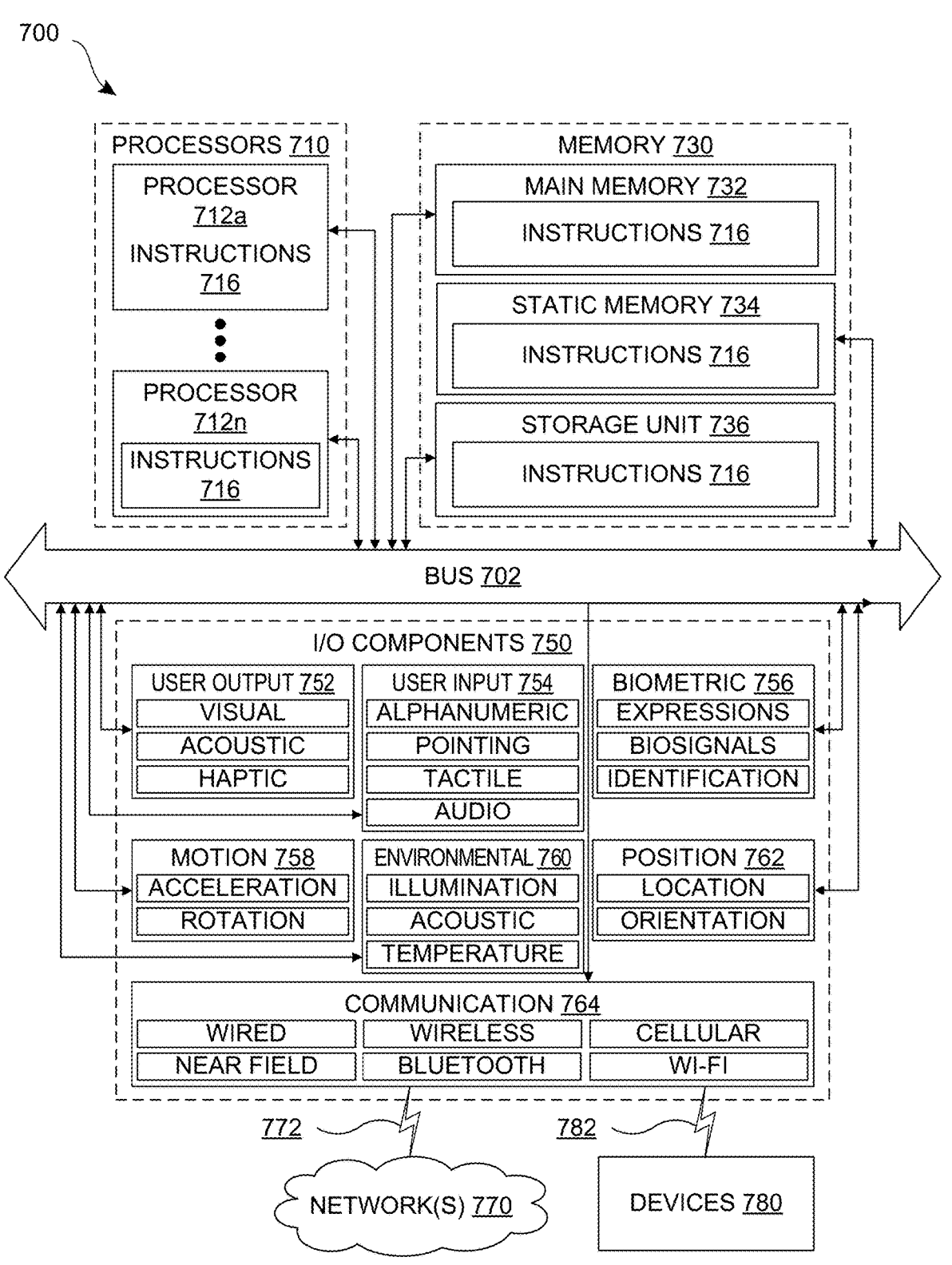
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors $712a$ to $712n$ that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one-or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

What is claimed is:
1. A data processing system comprising:
a processor; and
a memory in communication with the processor, the memory comprising executable instructions that, when executed by the processor, cause the data processing system to perform functions of:
receiving a set of user generated data points for developing a concept in a machine-learning (ML) model, wherein the concept comprises a desirable model behavior for a given set of inputs;
creating a local ML model for the concept, based on the set of user generated data points;
generating a first prompt, based on the set of user generated data points, for submission as input to a large language model (LLM) to prompt the LLM to automatically generate synthetic training data for training the ML model on the concept;
transmitting the first prompt to the LLM and receiving from the LLM the synthetic training data;
providing the synthetic training data for labeling at least some of the synthetic training data to generate a set of labeled synthetic training data;
training the local ML model and the ML model based on the set of labeled synthetic training data;
generating a second prompt, based on the set of labeled synthetic training data, for transmission as input to the LLM to prompt the LLM to automatically generate a set of updated synthetic training data;
transmitting the second prompt to the LLM and receiving from the LLM the set of updated synthetic training data; and
repeating a process of providing the set of updated synthetic training data for labeling at least some of the set of updated synthetic training data to generate a set of labeled updated synthetic training data, updating the local ML model and the ML model based on the set of labeled updated synthetic training data, generating another prompt based on the set of labeled updated synthetic training data, transmitting the another prompt to the LLM and receiving from the LLM another set of updated synthetic training data until when the another set of updated synthetic training data is provided to the ML model and local ML model as input and an output of the ML model no longer disagrees with an output of the local ML model.

2. The data processing system of claim 1, wherein the LLM is a generative pretrained transformer.

3. The data processing system of claim 1, wherein the ML model is a natural language processing model.

4. The data processing system of claim 1, wherein the at least some of the synthetic training data is selected from data points where the output of the local ML model and the ML model disagree.

5. The data processing system of claim 1, wherein the instructions, when executed by the processor further cause the data processing system to perform functions of:
measuring a disagreement between the local ML model and the ML model;
selecting the at least some of the synthetic training data and the at least some of the updated set of synthetic training data, based on the measured disagreement between the local ML model and the ML model.

6. The data processing system of claim 1, wherein at least one of the first prompt or the second prompt is generated by a prompt generating engine.

7. The data processing system of claim 1, wherein labeling the synthetic training data includes determining whether a data point in the synthetic training data is related to the concept and labeling one or more of the data points that are determined to be related to the concept with a correct label for the ML model.

8. The data processing system of claim 1, wherein to determine when the output of the ML model no longer disagrees with the output of the local ML model, the set of labeled updated synthetic training data is provided as input to the ML model and the local ML model and the output of the ML model is compared to the output of local ML model.

9. A method for training a machine-learning (ML) model to provide specific predictions for a given set of inputs comprising:

receiving a set of user generated data points for developing the ML model to provide the specific predictions for the given set of inputs;

training a local ML model for providing the specific predictions for the given set of inputs based on the set of user generated data points, the ML model being a trained global ML model and the local ML model being a smaller ML model than the global ML model;

generating a first prompt, using a prompt generating engine, based on the set of user generated data points, for submission as input to a large language model (LLM) to prompt the LLM to automatically generate synthetic training data for training the ML model on the given set of inputs;

transmitting the first prompt to the LLM and receiving from the LLM the synthetic training data;

labeling at least some of the synthetic training data to generate a set of labeled synthetic training data;

updating the local ML model and the ML model based on the set of labeled synthetic training data;

generating a second prompt, based on the set of labeled synthetic training data, for transmission as input to the LLM to prompt the LLM to automatically generate a set of updated synthetic training data;

transmitting the second prompt to the LLM and receiving from the LLM the set of updated synthetic training data; and repeating a process labeling at least some of the set of updated synthetic training data to generate a set of labeled updated training data, updating the local ML model and the ML model based on the set of labeled updated training data, generating another prompt based on the labeled updated training data, transmitting the another prompt to the LLM and receiving from the LLM another updated set of synthetic training data until the global ML model no longer disagrees with the local ML model with respect to the set of user generated data points.

10. The method of claim 9, wherein the LLM is a GPT-3 model that generates data based on the first or the second prompt.

11. The method of claim 9, wherein the ML model is a natural language processing model which is trained with a large corpus of data.

12. The method of claim 9, wherein the ML model is updated such that interference with previously developed local models and an original dataset on which the ML model was trained is reduced.

13. The method of claim 9, wherein the at least some of the synthetic training data is selected from data points where an output of the local ML model and the ML model disagree.

14. The method of claim 9, wherein labeling the at least some of the synthetic training data includes determining whether a data point in the synthetic training data is related to the specific predictions and labeling one or more of the data points that are determined to be related to the specific predictions with a correct label for the ML model.

15. The method of claim 9, wherein the labeling is done by one or more users.

16. The method of claim 9, wherein to determine when the ML model no longer disagrees with the local ML model with respect to the set of user generated data points, the updated set of synthetic training data is provided as input to the ML model and the local ML model and an output of the ML model is compared to an output of the local ML model.

17. A non-transitory computer readable medium on which are stored instructions that, when executed, cause a programmable device to perform functions of:

receiving a set of user generated data points for developing a concept in a machine-learning (ML) model, wherein the concept comprises a desirable model behavior for a given set of inputs;

creating a local ML model for the concept, based on the set of user generated data points;

generating a first prompt, based on the set of user generated data points, for submission as an input to a large language model (LLM) to prompt the LLM to automatically generate synthetic training data for training the ML model on the concept;

transmitting the first prompt to the LLM and receiving from the LLM the synthetic training data;

providing the synthetic training data for labeling at least some of the synthetic training data to generate a set of labeled synthetic training data;

training the local ML model and the ML model based on the set of labeled synthetic training data;

generating a second prompt, based on the set of labeled synthetic training data, for transmission as input to the LLM to prompt the LLM to automatically generate a set of updated synthetic training data;

transmitting the second prompt to the LLM and receiving from the LLM the set of updated synthetic training data; and repeating a process of providing the set of updated synthetic training data to the user for labeling at least some of the set of updated synthetic training data to generate a set of labeled updated synthetic training data, updating the local ML model and the ML model based on the set of labeled updated synthetic training data, generating another prompt, based on the set of labeled updated synthetic training data, transmitting the another prompt to the LLM and receiving from the LLM another set of updated synthetic training data until when the another set of updated synthetic training data is provided to the ML model and local ML model as an input and an output of the ML model no longer disagrees with an output of the local ML model.

18. The non-transitory computer readable medium of claim 17, wherein the at least some of the synthetic training data is selected from data points where the output of the local ML model and the output of the ML model disagree.

19. The non-transitory computer readable medium of claim 17, wherein to determine when the output of the ML model no longer disagrees with the output of the local ML model, the set of updated synthetic training data is provided as input to the ML model and the local ML model and the output of the ML model is compared to the output of local ML model.

20. The non-transitory computer readable medium of claim 17, wherein the ML model is updated such that interference with previously developed local models and an original dataset on which the ML model was trained is reduced.

* * * * *